United States Patent [19]

Katsumata et al.

[11] 4,170,208
[45] Oct. 9, 1979

[54] IGNITION SYSTEM FOR A MULTIPLE CYLINDER INTERNAL COMBUSTION ENGINE

[75] Inventors: Mitsuo Katsumata, Susono; Tetsuya Kondo, Shizuoka; Takeshi Watanabe, Fuji, all of Japan

[73] Assignee: Kokusan Denki Co., Ltd., Numazu, Japan

[21] Appl. No.: 883,877

[22] Filed: Mar. 6, 1978

[30] Foreign Application Priority Data

Mar. 7, 1977 [JP] Japan .................................. 52/24558

[51] Int. Cl.² ............................................. F02P 1/00
[52] U.S. Cl. ......................... 123/148 CC; 123/148 E; 307/252 C
[58] Field of Search .................. 123/148 CC, 148 E; 357/252 C; 315/209 CD, 209 M

[56] References Cited

U.S. PATENT DOCUMENTS

| | | | |
|---|---|---|---|
| 3,621,826 | 11/1971 | Christensen | 123/148 E |
| 3,828,753 | 8/1974 | Reddy | 123/148 CC |
| 3,880,132 | 4/1975 | Whatley, Jr. | 123/148 CC |
| 3,912,945 | 10/1975 | Nakagawa | 307/252 C |
| 3,933,139 | 6/1976 | Boeghly | 123/148 CC |
| 3,937,190 | 2/1976 | Katsumata | 123/148 CC |
| 3,998,198 | 12/1976 | Jereb | 123/148 CC |
| 4,007,724 | 2/1977 | Mura | 123/148 CC |
| 4,010,726 | 3/1977 | Kondo et al. | 123/148 CC |
| 4,015,564 | 4/1977 | Fitznor | 123/148 CC |
| 4,016,433 | 4/1977 | Brooks | 123/148 E |
| 4,023,049 | 5/1977 | Brooks | 307/252 C |
| 4,059,084 | 11/1977 | Jundt | 123/148 E |
| 4,090,488 | 5/1978 | Ohki et al. | 123/148 E |
| 4,109,632 | 8/1978 | Brooks | 123/148 E |
| 4,116,188 | 9/1978 | Nagasawa | 123/148 CC |

Primary Examiner—Charles J. Myhre
Assistant Examiner—R. A. Nelli
Attorney, Agent, or Firm—Pearne, Gordon, Sessions, McCoy & Granger

[57] ABSTRACT

An ignition system for a multiple cylinder internal combustion engine comprises a power supply, a plurality of ignition coils, a plurality of control circuits, each provided in association with a respective one of the ignition coils for controlling the primary current of the associated ignition coil, and a plurality of signal sources producing signals in turn and in time with the rotation of the engine, each of the signal sources provided in association with a respective one of the control circuits, and adapted to produce a signal in advance of the ignition timing of the associated ignition coil. Each of the control circuit includes a gate turn-off thyristor connected in series with the primary winding of the associated ignition coil. The gate turn-off thyristor is adapted to be turned on when the signal source associated with the control circuit including the gate turn-off thyristor produces a signal in advance of the associated ignition coil, and is turned off when one of other signal sources produces a signal at the ignition timing of the associated ignition coil. The above mentioned one of other signal sources also serves to turn on the gate turn-off thyristor of the associated control circuit. Accordingly, the number of required signal sources is reduced and is equal to the number of ignition coils.

9 Claims, 3 Drawing Figures

IGNITION SYSTEM FOR A MULTIPLE CYLINDER INTERNAL COMBUSTION ENGINE

BACKGROUND OF THE INVENTION

The present invention relates to an ignition system for a multiple cylinder internal combustion engine, having a plurality of ignition coils, and a plurality of control circuits, each including a gate turn-off thyristor for controlling the primary current of a respective one of the ignition coils.

In an ignition system incorporating a gate turn-off thyristor, also referred to as gate controlled switch, it has been suggested to employ two signal sources such as signal generating windings, one for supplying a signal for turning on the gate turn-off thyristor (hereinafter referred to as GTO), and the other for supplying a signal for turning off the GTO.

When such concept is applied to an ignition system for a multiple cylinder internal combustion engine having a plurality of ignition coils, the number of the signal sources required is twice as many as the number of the ignition coils. Such construction is unsatisfactory because of the substantial size and high cost of production.

SUMMARY OF THE INVENTION

An object of the invention is to reduce the number of the signal sources in an ignition system for a multiple cylinder internal combustion engine having a plurality of ignition coils and a plurality of control circuits, each including a GTO for controlling the primary current of a respective one of the ignition coils.

Another object of the invention is to provide an ignition system which can be manufactured economically, and is yet highly reliable.

An ignition system according to the present invention comprises a power supply, a plurality of ignition coils, a plurality of control circuits, each provided in association with a respective one of the ignition coils for controlling the primary current of the associated ignition coil, and a plurality of signal sources producing signals in turn and in synchronism with the rotation of the engine, each of the signal sources provided in association with a respective one of said control circuits, and adapted to produce a signal in advance of the ignition timing of the associated ignition coil.

Each of the control circuits includes a GTO connected to form a series circuit with the primary winding of the associated ignition coil, the series circuit being connected to the power supply, so that a current flows through the primary winding when the GTO is conducting.

Each control circuit also includes a transistor switch provided to conduct in response to the signal from the associated signal source. The transistor switch may have its emitter coupled to the power supply.

The control circuit also includes a first coupling device for coupling the gate of the GTO to the power supply through the transistor switch to turn on the GTO when the transistor switch is conducting. The first coupling device may include a resistor having a first end coupled to the gate of the GTO and having a second end coupled to the collector of the transistor switch.

The control circuit also includes a capacitor, and a second coupling device for coupling the capacitor to the power supply through the transistor switch to charge the capacitor when the transistor switch is conducting, so that the capacitor is ready for subsequent discharge to provide a turn-off signal to the GTO. The capacitor may have a first terminal coupled to the gate of the GTO and have a second terminal coupled to the collector of the transistor switch to serve also as at least part of the first coupling device.

The second coupling device may include a diode coupling the second terminal of the capacitor to the collector of the transistor switch.

The control circuit further includes an auxiliary thyristor, which may be in the form of an ordinary thyristor, or of a gate turn-off thyristor. The term "auxiliary" is used herein and in the appended claims to make nothing more than distinction from the GTO mentioned first. The auxiliary thyristor is adapted to discharge the capacitor to apply a turn-off signal to the GTO.

The control circuit further includes a third coupling device for coupling the gate of the auxiliary thyristor to the power supply through the transistor switch of a control in association with one of other signal sources producing a signal at the ignition timing of the ignition coil associated with the auxiliary thyristor to be coupled by the third coupling device. The third coupling device may include a resistor having one end coupled to the gate of the auxiliary thyristor and having the other end coupled to the power supply through the transistor switch of the control circuit associated with the one of other signal sources.

The GTO is turned on in response to the signal from the associated signal source to permit a current flow through the primary winding, and the GTO is turned off in response to the signal from the one of other signal sources to interrupt the primary current at the ignition timing of the associated ignition coil.

Since each of the GTO's is turned on in response to a signal from the associated signal source and is turned off in response to a signal from one of other signal sources which also serves to turn on the GTO associated therewith, the number of the necessary signal sources is equal to the number of the ignition coils. Accordingly, the size and cost of the ignition system is significantly reduced.

BRIEF DESCRIPTION OF THE DRAWINGS

Other features and advantages of the present invention will be apparent from the following detailed description of the embodiments, taken in conjunction with the accompanying drawings, in which.

DETAILED DESCRIPTION OF THE PREFERRED EMBODIMENTS

Figure 1:
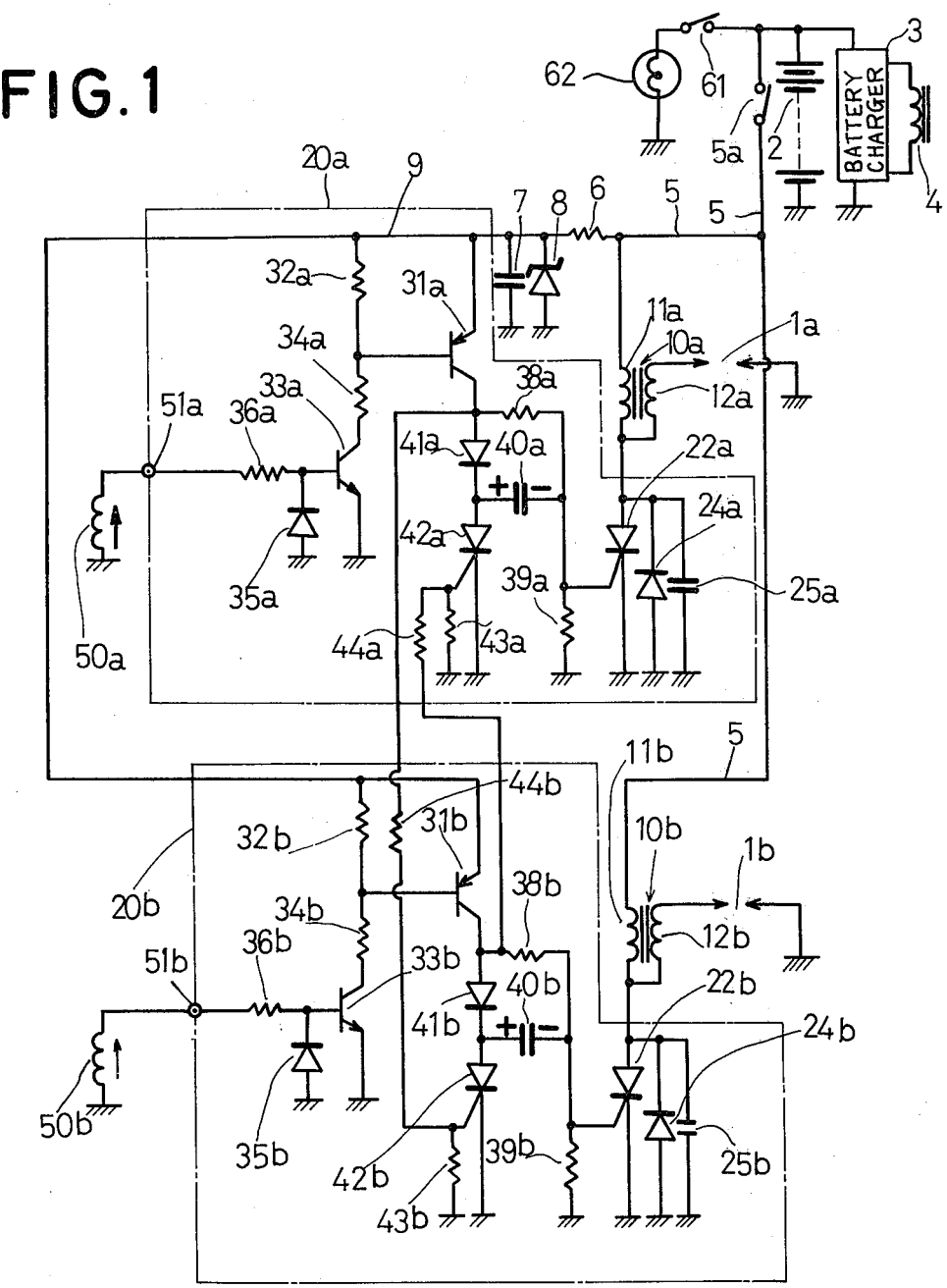
FIG. 1 shows an embodiment of the invention.

Referring now more particularly to FIG. 1, there is shown an embodiment of an ignition system for multiple cylinder internal combustion engine.

The number of the spark plugs 1a, 1b each provided in a respective cylinder (not shown) is shown to be two in the embodiment illustrated.

There is provided a DC power supply, which in this embodiment, comprises a battery 2 charged by a battery charger 3 energized by a generating winding 4 of an AC generator (not shown) driven by the engine.

The negative terminal of the battery 2 is grounded and the positive terminal of the battery 2 is connected through a switch 5a to a lead 5. The positive terminal of the battery is also connected through a second switch 61 to a load shown as a lamp 62.

The lead 5 is connected to a first end of a resistor 6, a second end of which is connected to one terminal of a capacitor 7 having the other terminal grounded and to the cathode of a Zener diode 8 having the anode grounded. A lead 9 is connected to the second end of the resistor 6. The circuit comprising the resistor 6, the capacitor 7 and the Zener diode 8 serves to absorb voltage surges which may originate from the battery charger 3 or may be caused by on-off of the switch 61 connecting the load 62, thereby preventing erroneous operation of the circuit elements connected to the lead 9, such circuit elements being described hereinbelow.

The ignition system comprises a first and a second ignition coils associated with respective spark plugs 1a, 1b, a first and a second control circuits 20a, 20b associated with respective ignition coils 10a, 10b, and a first and a second signal sources 50a, 50b associated with respective control circuits 20a, 20b.

The ignition coil 10a includes a primary winding 11a and a secondary winding 12a. The secondary winding 12a has one end connected to one end of the primary winding 11a and has the other end connected to one electrode of the spark plug 1a, the other electrode of which is grounded, to fire the spark plug 1a.

The ignition coil 10b is similarly constructed and associated with the spark plug 1b.

The signal sources 50a, 50b, are shown as signal generating windings, which may be disposed around the periphery of an AC generator (not shown) driven by the engine, to produce signals in turn and in synchronism with the rotation of the engine. The signal source 50b is adapted to produce a signal at the ignition timing of the ignition coil 10a. Similarly, the signal source 50a is adapted to produce a signal at the ignition timing of the ignition coil 10b. Looked at from a different view point, each of the signal sources 50a, 50b produces a signal in advance of the ignition timing of the associated ignition coils 10a, 10b.

The first control circuit 20a includes a GTO 22a connected to form a series circuit with the primary winding 11a of the ignition coil 10a, the series circuit being connected to the battery. More specifically, the cathode of the GTO 22a is grounded and the anode of the GTO 22a is connected to one end of the primary winding 11a. The other end of the primary winding 11a is connected to the lead 5. Connected to the anode of the GTO are the cathode of a diode 24a and one terminal of a capacitor 25a. The anode of the diode 24a and the other terminal of the capacitor 25a are grounded. The diode 24a and the capacitor 25a serve to protect the GTO from reverse overvoltage and also to provide a path for the secondary current of the ignition coil 10a. The gate and the cathode of the GTO are coupled by a resistor 39a.

The control circuit 20a further includes a first transistor 31a of a PNP type, having its emitter connected to the lead 9. The base of the transistor 31a is connected to one end of a resistor 32a, the other end of which is connected to the lead 9. The control circuit 20a of the embodiment further includes a second transistor 33a of an NPN type, having its emitter grounded. The collector of the transistor 33a is connected via a resistor 34a to the base of the first transistor 31a. The base of the transistor 33a is connected to the cathode of a diode 35a, whose anode is grounded. The base of the transistor 33a is also connected via a resistor 36a to one of the output terminals of the signal source 50a, the other output terminal of which is grounded. The second transistor 33a is adapted to conduct when the signal source 50a produces a signal of a positive polarity indicated by an arrow beside the signal source 50a. With the second transistor 33a conducting, a base current flows through the first transistor 31a. Accordingly, the first transistor 31a, as well as the second transistor 33a, is adapted to be conductive in response to a positive signal output from the signal source 50a.

There is provided a resistor 38a having a first end connected to the gate of the GTO and having a second end connected to the collector of the transistor 31a. There is also provided a capacitor 40a having a first terminal connected to the gate of the GTO, and a diode 41a having its cathode connected to a second terminal of the capacitor 40a and having its anode connected to the collector of the transistor 31a. The resistor 38a conducts a current to the gate of the GTO when the transistor 31a is conducting. The capacitor 40a is charged when the transistor 31a is conducting, and the charging current flows through the gate of the GTO 22a. Thus, the resistor 38a and the series circuit comprising the capacitor 40a and the diode 41a serve to couple the gate of the GTO 22a through the transistor 31a to the lead 9 and hence to the DC power supply 2.

The diode 41a mentioned above also serves to couple the capacitor 40a to the DC power supply through the transistor 31a to charge the capacitor 40a in a polarity indicated by "+" and "−" in the drawing, when the transistor 31a is conducting, so that the capacitor 40a is ready for subsequent discharge to provide a turn-off signal to the GTO 22a.

The control circuit 20a further includes an auxiliary thyristor 42a having its cathode grounded and having its anode connected to the second terminal of the capacitor 40a. The gate and the cathode of the thyristor 42a are coupled by a resistor 43a. The thyristor 42a is adapted to discharge the capacitor to apply a negative voltage across the gate and the cathode of the GTO 22a to turn off the GTO, when the thyristor 42a conducts.

A second control circuit 20b is similarly constructed as the first control circuit 20a and includes elements designated by the same numerals with a suffix of "b" in place of "a" of the elements of the first control circuit. The second control circuit 20b thus includes a first transistor 31b adapted to be conductive in response to a signal from the associated signal source 50b.

Returning again to the first control circuit 20a, there is further provided a resistor 44a having one end connected to the gate of the thyristor 42a and having the other end coupled to the DC power supply through the transistor 31b of the second control circuit 20b. Thus the resistor 44a serves to couple the gate of the thyristor 42a to the DC power supply through the transistor 31b of the second control circuit 20b in association with the second signal source 50b producing a signal at the ignition timing of the ignition coil 10a associated with the thyristor 42a to be coupled by the resistor 44a.

The second control circuit 20b similarly includes a resistor 44b for coupling the gate of the thyristor 42b to the DC power supply through the transistor 31a of the first circuit 20a in association with the first signal source 50a producing a signal at the ignition timing of the ignition coil 10b.

When the engine is not rotating, the signal sources 50a, 50b do not produce signals, so that the transistors 31a, 31b, 33a, 33b are not conducting even if the switch 5a is closed and the control circuits are connected to the DC power supply. The GTO's 22a, 22b do not receive turn-on signals, and are therefore kept nonconductive. In this state, only a small current flows through the resistor 6 and the Zener diode 8, so that power loss is insignificant.

As the engine rotates, the signal sources 50a, 50b produces a signal in turn. Supposing that the signal source 50a is the first to produce a signal, of a polarity indicated by the arrow, a base current flows through the transistor 33a, so that the transistor 33a conducts. At least part of the collector current of the transistor 33a flows through the base of the transistor 31a, so that the transistor 31a conducts. With the transistor 31a conducting, a gate current of the GTO 22a is supplied from the DC power supply, through the transistor 31a, and partly through the resistor 38a and partly through the diode 41a and the capacitor 40a. Accordingly, the GTO 22a is turned on to conduct a current through the primary winding 11a. The primary current is gradually increased because of the reactance of the primary winding 11a, and magnetic energy is accumulated in the core of the ignition coil.

A part of the gate current of the GTO 22a flowing through the capacitor 40a charges the capacitor 40a to a polarity indicated by "+" and "−" in the drawing.

As the engine further rotates, the second signal source 50b produces a signal, to render the transistors 33b, 31b conductive.

When the transistor 31b conducts, a gate current of the thyristor 42a flows through the transistor 31b, so that the thyristor 42a is turned on to discharge the capacitor 40a to apply a negative voltage across the gate and the cathode of the GTO 22a to turn off the GTO 22a. With the GTO 22a turned off, the primary current of the ignition coil 10a is suddenly decreased, and the magnetic energy stored in the core of the ignition coil 10a is discharged, by producing high voltage in the secondary winding 12a and firing the spark plug 1a.

When the thyristor 42a conducts, the voltage on the capacitor 40a is applied through the resistors 38a, 44b across the gate and the cathode of the thyristor 42b as a negative pulse, so that the thyristor 42b is prevented from erroneous turn-on which may be caused owing to noises such as inductive noises originating from the ignition coils, or from external noise sources.

When the transistor 31b conducts, the GTO 22b is turned on and the capacitor 40b is charged. The capacitor 40b is discharged when the thyristor 42b conducts in response to a signal from the first signal source 50a, at the ignition timing of the ignition coil 10b.

With the specific embodiment illustrated, the capacitor 40a serves to provide a path for turn-on signal to the GTO 22a, and hence the resistor 38a may be omitted. The capacitor 40a also serves to supply a turn-off signal upon discharge through the auxiliary thyristor 42a. The capacitor 40a also serves to apply a negative voltage to the gate of the auxiliary thyristor 42b to prevent erroneous turn-on of the thyristor 42b. The ignition system of the embodiment is therefore compact in size and economical to manufacture, and is yet highly reliable.

However, it will be understood that the invention is not limited to the specific embodiment described above, and the capacitor 40a may be used for the sole purpose of providing the turn-off signal.

The resistor 38a may be replaced by any other coupling element such as a capacitor.

The resistor 44a may be replaced by any other coupling element such as a capacitor.

Similar modifications may be made to the control circuit 20b.

Figure 2:
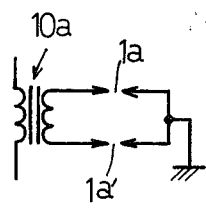
FIG. 2 shows a modification of connection of a secondary winding wherein two spark plugs are associated with a single secondary winding.

The end of the secondary winding 12a illustrated in FIG. 1 as being connected to one end of the primary winding, may be, as shown in FIG. 2, disconnected from the primary winding and an additional spark plug 1a' may be connected between the disconnected end and the ground. The spark plug 1a' is disposed in a cylinder which is in the final stage of exhaustion stroke when the cylinder associated with the spark plug 1a is at the spark timing, and the cylinder associated with the spark plug 1a' is at the spark timing when the cylinder associated with the spark plug 1a is in the final stage of the exhaustion stroke. Similar modification may be made with respect to the secondary winding 12b.

The resultant ignition system may be adopted to a four-cylinder internal combustion engine. When a high voltage is generated in one of the secondary windings, the two spark plugs associated with the secondary winding both fire. Firing at one of the spark plugs in the cylinder at the spark timing is effective to cause combustion. Firing at the other spark plug is ineffective since the cylinder associated with the spark plug is in the final stage of exhaustion stroke.

It will be understood, the invention is applicable to ignition systems for use in internal combustion engines wherein there are three or more ignition coils. In any case, the gate of the thyristor of each of the control circuit is coupled to the DC power supply through the transistor of another control circuit in association with one of other signal sources producing a signal at the ignition timing of the ignition coil associated with the thyristor to be coupled.

Figure 3:
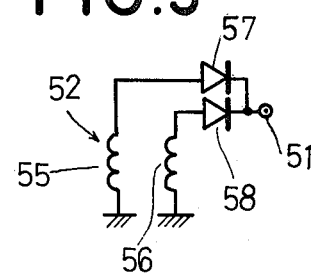
FIG. 3 shows a modification of a signal source.

FIG. 3 shows a modification of a signal source 52, which may be used in substitution for the signal source 50a or 50b. The signal source 52 comprises a first signal generating winding 55 having one end grounded and having the other end connected through a diode 57 to the external terminal 51 and a second signal generating winding 56 having one end grounded and having the other end connected through a diode 58 to the external terminal 51. The external terminal 51 may be coupled to the external terminal 51a, or 51b of FIG. 1. The first signal generating winding is adapted to produce a relatively large signal at low engine speeds. The second signal generating winding 56 is adapted to produce a signal in advance of the first signal, but it only produces such signal of a sufficient magnitude when the engine speed is relatively high. While the engine speed is low, the ignition timing is determined by the signal from the first signal generating winding 55. Above a certain preselected engine speed, the ignition timing is determined by the second signal generating winding 56. Thus the signal source 52 enables ignition angle advance.

While there have been described what are at present considered to be the preferred embodiments of this invention, it will be obvious to those skilled in the art that various changes and modifications may be made therein without departing from the invention, and it is aimed, therefore, in the appended claims to cover all such changes and modifications as fall within the true spirit and scope of the invention.

What is claimed is:

1. An ignition system for a multiple cylinder internal combustion engine, comprising:
   a power supply,
   a plurality of ignition coils,
   a plurality of control circuits, each provided in association with a respective one of said ignition coils for controlling the primary current of the associated ignition coil, and
   a plurality of signal sources producing signals in turn and in synchronism with the rotation of the engine, each of said signal sources provided in association with a respective one of said control circuits, and adapted to produce a signal in advance of the ignition timing of the associated ignition coil,
   wherein each of said control circuits includes:
   a gate turn-off thyristor connected to form a series circuit with the primary winding of the associated ignition coil, said series circuit being connected to said power supply,
   a transistor switch provided to conduct in response to the signal from the associated signal source,
   a first coupling means for coupling the gate of said gate turn-off thyristor to said power supply through said transistor switch to turn on said GTO when said transistor is conducting,
   a capacitor,
   a second coupling means for coupling said capacitor to said power supply through said transistor switch to charge said capacitor when said transistor switch is conducting,
   an auxiliary thyristor for discharging said capacitor to apply a turn-off signal to said gate turn-off thyristor,
   a third coupling means for coupling the gate of said auxiliary thyristor to said power supply through the transistor switch of a control circuit in association with one of other signal source producing a signal at the ignition timing of the ignition coil associated with said auxiliary thyristor to be coupled by said third coupling means,
   whereby said gate turn-off thyristor is turned on in response to the signal from the associated signal source to permit a current flow through the primary winding, and is turned off in response to the signal from said one of other signal source at the ignition timing of the associated ignition coil.

2. An ignition system as set forth in claim 1, wherein said first coupling means includes a resistor having one end coupled to the gate of said gate turn-off thyristor and having the other end coupled through said transistor switch to said power supply.

3. An ignition system as set forth in claim 1, wherein said capacitor has a first terminal coupled to the gate of said gate turn-off thyristor and has a second terminal coupled to said power supply through said transistor switch to serve as at least part of said first coupling means.

4. An ignition system as set forth in claim 1, wherein said capacitor has a first terminal connected to the gate of said gate turn-off thyristor, and said second coupling means includes a diode coupling a second terminal of said capacitor through said transistor switch to said power supply.

5. An ignition system as set forth in claim 1, wherein said third coupling means includes a resistor having one end connected to the gate of said auxiliary thyristor and having the other end connected to said power supply through the transistor switch of the control circuit associated with said one of other signal sources.

6. An ignition system for a multiple cylinder internal combustion engine, comprising:
   a power supply,
   a plurality of ignition coils,
   a plurality of control circuits, each provided in association with a respective one of said ignition coils for controlling the primary current of the associated ignition coil, and
   a plurality of signal sources producing signals in turn and in synchronism with the rotation of the engine, each of said signal sources provided in association with a respective one of said control circuits, and adapted to produce a signal in advance of the ignition timing of the associated ignition coil,
   wherein each of said control circuit includes:
   a gate turn-off thyristor connected to form a series circuit with the primary winding of the associated ignition coil, said series circuit being connected to said DC power supply,
   a transistor switch provided to conduct in response to the signal from the associated signal source,
   a capacitor having a first terminal coupled to the gate of said gate turn-off thyristor and having a second terminal coupled to said power supply through said transistor switch to be charged when said transistor switch is conducting and to turn on the gate turn-off thyristor when the charging current flows,
   an auxiliary thyristor for discharging said capacitor to apply a turn-off signal to said gate turn-off thyristor, said auxiliary thyristor having its anode coupled to the second terminal of said capacitor, having its cathode connected to the cathode of said gate turn-off thyristor, and having its gate coupled to said power supply through the transistor switch of a control circuit in association with one of other signal sources producing a signal at the ignition timing of the ignition coil associated with said auxiliary thyristor,
   whereby said gate turn-off thyristor is turned on in response to the signal from the associated signal source to permit a current flow through the primary winding, and is turned off in response to the signal from said one of other signal sources to interrupt the current through said primary winding at the ignition timing of the associated ignition coil.

7. An ignition system as set forth in claim 6, further comprising a resistor having one end coupled to the gate of said gate turn-off thyristor and having the other end coupled to said power supply through said transistor switch.

8. An ignition system as set forth in claim 6, further comprising a diode and a resistor,
   wherein said diode has its anode coupled to said power supply through said transistor switch and has its cathode connected to the second terminal of said capacitor, and
   said resistor has one end connected to the gate of said gate turn-off thyristor and has the other end coupled to said power supply through of said transistor switch.

9. An ignition system as set forth in claim 8, wherein said auxiliary thyristor has its gate coupled through a resistor to said power supply through the transistor switch of the control circuit associated with said one of other signal sources.

* * * * *